United States Patent Office 2,838,438
Patented June 10, 1958

2,838,438

N-(2-PYRIDYL)-TETRACHLOROPHTHALIMIDE, PROCESS AND USE AS INSECTICIDE

William J. Pyne, Painesville, Ohio, assignor to Diamond Alkali Company, Cleveland, Ohio, a corporation of Delaware No Drawing. Application August 23, 1956
Serial No. 605,711

6 Claims. (Cl. 167—33)

This invention relates to the novel compound N-(2-pyridyl)-tetrachlorophthalimide, its preparation and application.

The compound of this invention has the following formula:

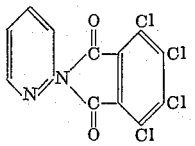

Generally, the above compound can be prepared conveniently by reacting 2-amino-pyridine with tetrachlorophthalic anhydride and separating the desired product from the reaction mass, e. g., by filtration, with or without recrystallization from a solvent such as acetic acid.

The compound of this invention exhibits biological activity as will be set forth in some detail hereinafter in a specific example. Moreover, it also has utility as a dye intermediate. The compound may be employed in a variety of formulations, both liquid and solid, including finely-divided powders, granular materials, as well as various liquid solutions, concentrates, emulsifiable concentrates, slurries, and the like, depending upon the application intended and the formulation media employed.

It will be appreciated that the compound of this invention may be used in various biologically active compositions which contain the compound as an essential ingredient, together with various other ingredients such as diluents, extenders, fillers, conditioners, solvents, and the like, as various clays, diatomaceous earth, talc, spent catalyst, alumina-silica materials and such liquids as water and various organic liquids such as kerosene, benzene, acetone, toluene, xylene and other petroleum distillate fractions or mixtures thereof.

When liquid formulations are employed or dry materials prepared which are to be used in liquid form, it is desirable in certain instances additionally to employ a wetting, emulsifying or dispersing agent to facilitate use of the formulation, e. g., Triton X-155 (alkyl aryl polyether alcohol).

In order that those skilled in the art may more completely understand the present invention and the preferred methods by which the same may be carried into effect, the following specific examples are offered:

EXAMPLE I

Part A

In a large test tube are placed 10 gm. of 2-amino-pyridine and 28 gm. of tetrachlorophthalic anhydride. The tube is heated to facilitate reaction and the product obtained is recrystallized from acetic acid to yield a yellow solid melting at 191°–193° C. Chemical analysis of the product indicates formation of the desired $C_{13}H_4Cl_4N_2O_2$ and is as follows, the amounts indicated being in terms of percent by weight:

| Element | Calculated | Actual |
|---|---|---|
| C | 43.1 | 42.87 |
| H | 1.11 | 1.34 |
| Cl | 39.2 | 38.4 |
| N | 7.72 | 7.65 |

Part B

To demonstrate a high degree of biological activity of the compound of this invention tests are conducted to demonstrate its effectiveness as a protective for tomato foliage afflicted with the early blight fungus (Alternaria solani). Using the N-(2-pyridyl)-tetrachlorophthalimide of Part A, two aqueous formulations are prepared containing this compound in concentrations of 2000 and 400 parts per million, respectively, using 5% acetone as a solvent for the active compound and 0.01% Triton X-155 as an emulsifier. 100 ml. of these formulations are sprayed at 40 lbs. air pressure on duplicate test plants (tomato plants 5" to 7" high of the Bonny Best variety) while the plants are rotated on a turntable in a spray chamber, the center of the turntable being 45 inches from the nozzle of the spray gun.

After the spray deposit is dry, the treated plants, and comparable untreated control plants sprayed with the same formulation containing no toxicant, are sprayed with a spore suspension containing approximately 20,000 conidia of Alternaria solani per ml. using an atomizer delivering 20 ml. in a 30-second exposure period.

The thus-treated plants are held in a water-saturated atmosphere for 24 hours at 70° F. to permit spore germination and infection by the early blight. The plants are then removed to a greenhouse and after two to four days, lesion counts are made on the three uppermost fully expanded leaves. The data obtained are converted to percentage disease control based on the number of lesions found on the control plant. Using this procedure, it is observed that at a concentration of 2000 parts per million the product of Part A gives a 99% control of the early blight, while at the lower concentration of 400 parts per million a 96% control is achieved.

Part C

The procedure of Part B is repeated and at concentrations of 400, 80 and 16 parts per million percentage controls of early blight of 95%, 90%, and 70%, respectively, are obtained, thus indicating a high degree of fungicidal activity even at relatively low concentrations.

Part D

The product of Part A is formulated into a 25% wettable powder and dispersed in water to produce a concentration of 1% actual toxicant. This formulation is applied to cranberry bean plants by dipping the plants therein. After the treated plants are dried, untreated Mexican bean beetles are caged thereon. Forty-eight hours after the treatment, it is observed that a 90% insect mortality is achieved with no plant injury and with 60% feeding on the plant, as compared to a 0% mortality for untreated plants having the same type of insects caged thereon and a 100% feeding on the untreated plants. This data indicates a high degree of insecticidal activity of the compound of this invention.

It is to be understood that although the invention has been described with specific reference to particular embodiments thereof, it is not to be so limited, since changes and alterations therein may be made which are within the full intended scope of this invention as defined by the appended claims.

What is claimed is:

1. The compound N-(2-pyridyl)-tetrachlorophthalimide.

2. The method of preparing N-(2-pyridyl)-tetrachlorophthalimide which comprises reacting 2-amino-pyridine and tetrachlorophthalic anhydride.

3. A biologically active composition of matter containing as an active ingredient N-(2-pyridyl)-tetrachlorophthalimide, in a biologically active amount and a major proportion of a carrier.

4. The method of treating plants which comprises applying as a biologically active material a composition containing as an essential active ingredient N-(2-pyridyl)-tetrachlorophthalimide, in a biologically active amount and a major proportion of a carrier.

5. The method of controlling fungi on plants which comprises applying thereto in fungicidal concentrations a composition containing as an essential active ingredient N-(2-pyridyl)-tetrachlorophthalimide, in a fungicidal amount and a major proportion of a carrier.

6. The method of killing insects which comprises contacting said insects with N-(2-pyridyl)-tetrachlorophthalimide.

References Cited in the file of this patent
UNITED STATES PATENTS 2,498,497     Kirchner et al. _____ Feb. 21, 1950